Jan. 15, 1957 P. J. HOHNSTEIN 2,777,462
GATE FOR IRRIGATION PIPE
Filed May 11, 1954
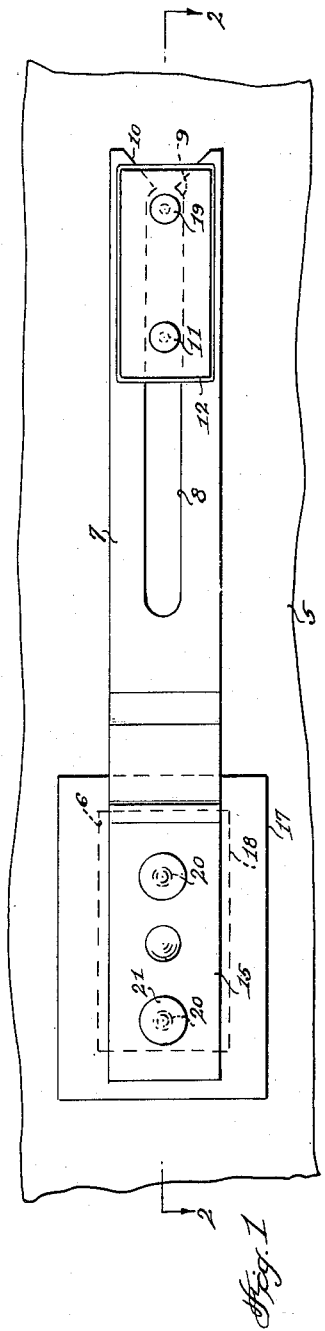
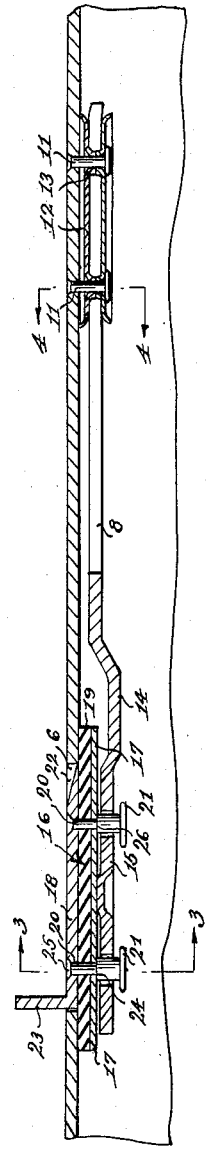
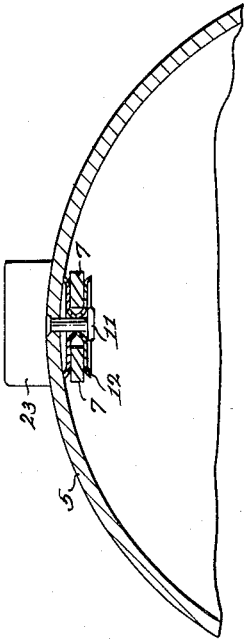
P. J. HOHNSTEIN
INVENTOR
BY *C. A. Snow & Co.*
ATTORNEYS.

United States Patent Office 2,777,462
Patented Jan. 15, 1957

2,777,462

GATE FOR IRRIGATION PIPE

Paul J. Hohnstein, Hastings, Nebr.

Application May 11, 1954, Serial No. 429,085

5 Claims. (Cl. 137—315)

This invention relates to irrigation pipes, and particularly the gate construction thereof, and aims to improve generally the construction of the irrigation pipe gate illustrated in my application for Letters Patent on Gate for Irrigation Pipe allowed March 29, 1954.

An important object of the present invention is to provide a gate of this character which may be readily moved to various positions with respect to the gate opening, to regulate or stop the flow of water as desired.

Another important object of the invention is to provide a gate for use with irrigation pipes wherein the gate support embodies a spring slide having a slot elongated longitudinally of the slide for the reception of securing rivets that secure the slide in position within the irrigation pipe, the slide being so constructed that it may be entirely removed from the pipe and replaced by moving the gate longitudinally of the pipe in the desired direction.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a fragmental elevational interior view of an irrigation pipe, provided with a gate constructed in accordance with the invention.

Fig. 2 is a longitudinal sectional view taken on line 2—2 of Fig. 1.

Fig. 3 is a fragmental sectional view taken on line 3—3 of Fig. 2.

Fig. 4 is a sectional view taken on line 4—4 of Fig. 2.

Referring to the drawing in detail, the reference character 5 indicates a conventional irrigation pipe which is formed with a discharge opening 6 which in the present showing is rectangular in formation, and through which water discharges from the pipe 5.

The gate comprises a spring slide 7 which is formed with a slot 8 elongated longitudinally of the spring slide and disposed along the longitudinal axis thereof. As shown, this slot 8 extends inwardly from one end of the spring slide, the edges of the slot indicated at 9 and which are disposed adjacent to the open end of the slot, being curved for purposes to be hereinafter more fully described. The extremities of the edges of the slot diverge at 10 providing inclined surfaces.

Secured to the pipe by means of the rivets 11, is a wear plate 12 which includes sheet metal sections formed with aligning openings 13 to receive the rivets 11, securing the wear plate in spaced relation with the inner surface of the pipe 5 to permit of sliding movement of the gate. It will also be seen that because of the inclined edges at the open end of the slot, the gate may be readily positioned by merely forcing the spring slide over the rivets, the portions of the spring slide at opposite sides of the slot 8, moving laterally to stop over the rivets and hold the spring slide against displacement in the event that the gate should be moved too far, in making the adjustment.

The spring slide has a laterally extended portion 14 providing an offset end 15, which offset portion provides a support for the closure member indicated generally by the reference character 16.

The closure member 16 includes a supporting plate 17 and a retainer plate 18 between which the rubber seal plate 19 is held, as by means of the rivets 20 which pass through aligning openings in the plates 17, 18 and 19 as well as enlarged openings in the offset end 15 of the spring slide. The offset end 15 of the spring slide is capable of movement with respect to the rivets 20, the heads 21 of the rivets providing stops to limit inward movement of the spring slide over the rivets, but permit of such movement as is necessary to operate the gate for its various adjustments.

The retainer plate is of a size to accurately fit within the discharge opening 6 of the spring slide with sufficient play to allow the spring slide to move into and out of said discharge opening, at the will of the operator. One edge of the retainer plate is beveled at 22 to permit the gate to be forced inwardly and readily moved longitudinally of the pipe in one direction, against one edge of the discharge opening. Extending laterally from one end of the retainer plate 18, is an operating flange 23 which protrudes a substantial distance through the discharge opening whereby the operator may move the gate to effect control of the gate.

The rivets 20 are formed with shoulders 24 which shoulders cooperate with the heads 25 of the rivets in clamping the plates 17, 18 and 19 therebetween.

Due to the construction shown and described I have provided an irrigation pipe gate which may be readily moved to regulate the size of the discharge opening of the gate as required, and one which may be readily removed from the pipe by merely exerting exceptional force on the gate in one direction to cause the spring legs of the spring slide 7 to move laterally releasing the gate.

It will also be seen that because of the inclined ends of the slot 8, the device may be readily returned to its operative position within the pipe with the minimum amount of effort on the part of the person or repair man.

Having thus described the invention, what is claimed is:

1. In an irrigation pipe having a discharge opening, a gate for controlling the discharge of fluid through said discharge opening, comprising an elongated spring support mounted within the pipe adjacent to said opening, said spring support having a partially closed open-ended slot extending inwardly from one end thereof, a wear plate, rivets securing said wear plate within said pipe, said rivets passing through said slot slidably securing said gate within said pipe, the side edges of the open end of said slot being inwardly curved providing a valve stop, the portion of said slot beyond said curved portion having its edges diverging towards the free end of said spring support so as to guide the open end of the spring support over said rivets and secure said support within the pipe, portions of said spring support at the free end of said slot being expandable to release said spring support from said rivets upon the application of force in one direction and a valve secured to the other end of said spring support movable with respect to said discharge opening for controlling discharge of water therethrough.

2. In an irrigation pipe having a discharge opening, a gate for controlling the discharge of fluid through said discharge opening, comprising an elongated spring support mounted within the pipe adjacent to said opening, said spring support having an open-ended slot extending inwardly from one end thereof, a wear plate secured within the pipe, rivets passing through said pipe and wear plate and disposed within said slot, the inner edges of said slot adjacent to the open end thereof being curved adapted to engage said wear plate normally preventing displacement of said spring support with respect to the irrigation pipe, portions of said spring support adjacent to said slot being adapted to yield laterally releasing said spring support from said pipe upon the application of excessive pressure on said gate, in one direction.

3. In an irrigation pipe having a discharge opening, a gate for controlling the discharge of fluid through said discharge opening, comprising an elongated spring support mounted within the pipe adjacent to said opening, said spring support having an open-ended slot extending inwardly from one end thereof, shoulders formed on the inner edges of said slot at the open end thereof, a wear plate disposed within said pipe, rivets extending through said pipe and wear plate securing the wear plate against movement, said shoulders providing a stop against which one of said rivets engages restricting movement of said spring support in one direction, said wear plate embodying spaced sections between which said spring support moves, the portions of said spring support adjacent to the open end of said slot being expandable to releasably secure said spring support to said wear plate, the edges of said slot at the open end thereof being curved so as to guide said spring support over said rivets, and a valve secured to the other end of said spring support movable into said discharge opening, controlling the passage of water through said discharge opening.

4. In an irrigation pipe having a discharge opening, a gate for controlling the discharge of fluid through said discharge opening, comprising an elongated spring support movable within the pipe, a valve secured to one end of said spring support movable within said discharge opening, controlling the flow of water through said discharge opening, a wear plate including guiding rivets extending inwardly from said wall of the pipe, said elongated spring support having a slot extending along the longitudinal axis thereof, said slot opening a one end of the spring support, said slot adapted to receive said rivets, guiding the spring support in its movements within the pipe, said spring support having shoulders extending into said slot providing stops normally limiting movement of said elongated spring longitudinally of said irrigation pipe, and the shoulders of said support being expandable to releasably secure said spring support to said wear plate.

5. In an irrigation pipe having a discharge opening, a gate for controlling the discharge of fluid through said discharge opening, comprising an elongated spring support mounted within the pipe adjacent to said opening, a valve secured to one end of said spring support, movable within said discharge opening for controlling the flow of fluid through the discharge opening, said spring support having an open-ended slot extending inwardly from one end thereof and disposed along the longitudinal axis of the spring support, rivets extending inwardly from the wall of said pipe, said rivets being received in said slot to guide the spring support in its movements longitudinally of the pipe, the edges of said slot being curved towards each other adjacent to the open end of the slot to provide obstructions against which said rivets engage limiting movement of said slide with respect to said rivets and the open end of said spring support being expandable whereby said spring support is expanded to disengage said rivets to release said spring support.

References Cited in the file of this patent

UNITED STATES PATENTS

| 1,325,334 | Schraeder | Dec. 16, 1919 |
| 1,859,181 | Thompson | May 17, 1932 |
| 2,656,852 | Westby | Oct. 27, 1953 |
| 2,670,574 | Schuster | Mar. 2, 1954 |
| 2,684,827 | Hohnstein | July 27, 1954 |